(12) United States Patent  
Calnek

(10) Patent No.: US 8,364,371 B2
(45) Date of Patent: Jan. 29, 2013

(54) BRAKE SYSTEM FUNCTIONAL INTEGRITY DETECTION

(75) Inventor: Scott Calnek, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 12/685,001

(22) Filed: Jan. 11, 2010

(65) Prior Publication Data

US 2011/0172878 A1 Jul. 14, 2011

(51) Int. Cl.
*B60T 7/12* (2006.01)

(52) U.S. Cl. .......................................... 701/78

(58) Field of Classification Search .............. 701/70, 701/78

See application file for complete search history.

(56) References Cited

U.S. PATENT DOCUMENTS

| | | | |
|---|---|---|---|
| 6,192,308 B1 * | 2/2001 | Onuma | 701/70 |
| 6,412,882 B1 * | 7/2002 | Isono et al. | 303/114.1 |
| 7,484,815 B2 * | 2/2009 | Ogawa et al. | 303/122 |
| 2008/0086266 A1 * | 4/2008 | Howard et al. | 701/213 |
| 2008/0229741 A1 * | 9/2008 | Isono et al. | 60/581 |
| 2008/0255732 A1 * | 10/2008 | Yasui et al. | 701/48 |
| 2009/0091180 A1 * | 4/2009 | Iwasaki et al. | 303/11 |

* cited by examiner

*Primary Examiner* — Mary Cheung
*Assistant Examiner* — Truc M Do
(74) *Attorney, Agent, or Firm* — Quinn Law Group, PLLC

(57) ABSTRACT

A method is provided for detecting a level of functional integrity of a braking system. The method includes applying a brake actuator, sensing via a first sensor the displacement of the braking actuator, and sensing via a second sensor the hydraulic pressure in the braking system. The method also includes determining whether the sensed hydraulic pressure corresponding to sensed displacement is within a predetermined acceptable range.

17 Claims, 3 Drawing Sheets

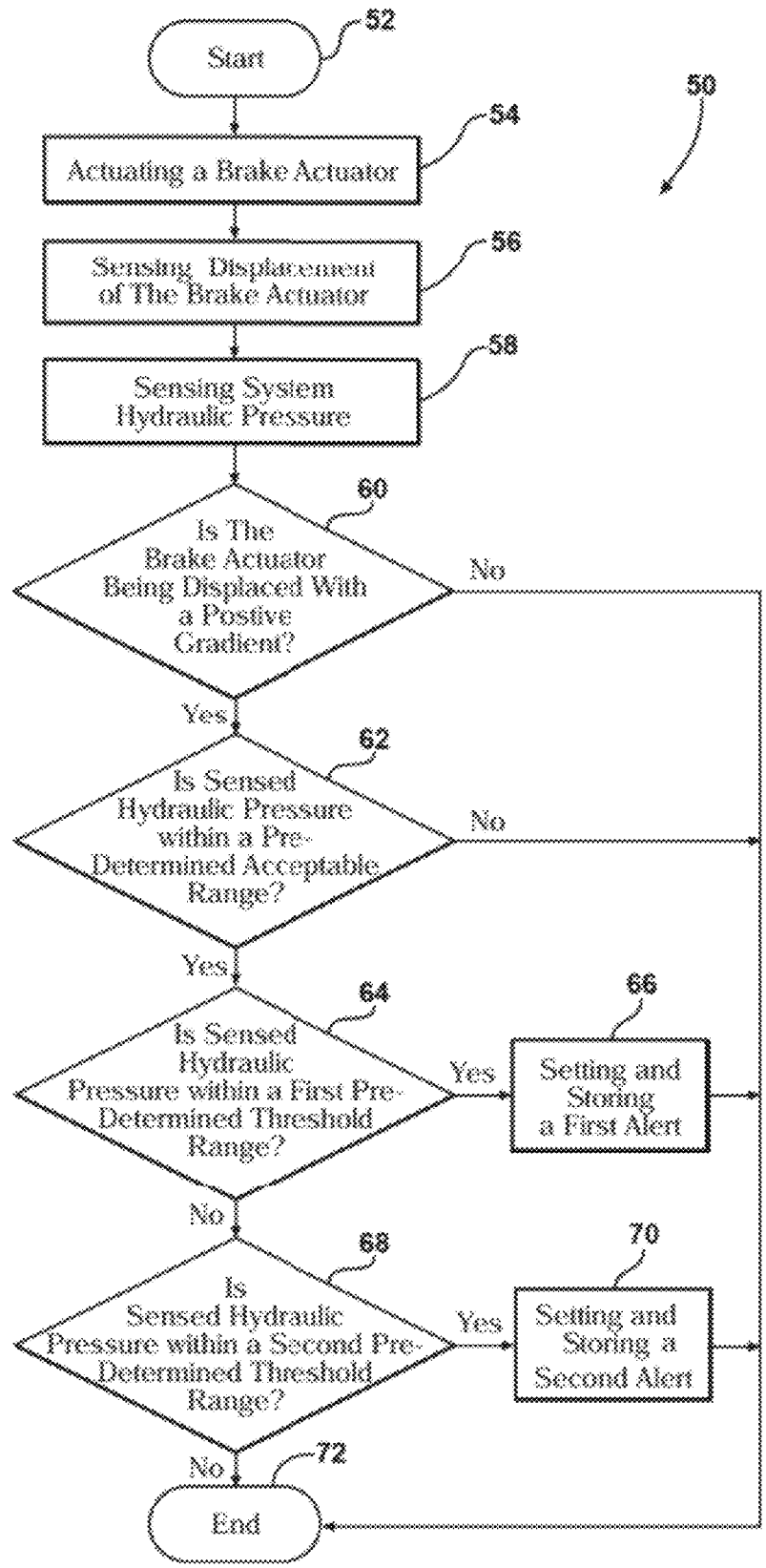

BRAKE SYSTEM FUNCTIONAL INTEGRITY DETECTION

TECHNICAL FIELD

The invention relates to braking systems and to detection of functional integrity of such braking systems.

BACKGROUND OF THE INVENTION

A brake is a device for applying a force against the friction of the road, slowing or stopping the motion of a machine or a vehicle, or a device to restrain such a machine or a vehicle from starting to move again. Brakes of some description are fitted to most wheeled vehicles, including automobiles of all kinds.

In an automobile, a braking system is employed for slowing or stopping the rotation of a road wheel by converting kinetic energy into heat, typically via friction. In most automotive braking systems, the brake acts on a hub of the vehicle's road wheel, but some vehicles use brakes which act on the axles or transmission. Friction brake systems commonly employ either a drum or a disc type brake mechanism.

A drum brake mechanism employs a set of brake shoes that are actuated to press against the inner surface of a rotating drum, typically connected to the hub of vehicle's road wheel, in order to generate friction for stopping the vehicle. The disc brake mechanism employs a set of brake pads mounted on a brake caliper, such that the pads are actuated to grip a rotating brake disc, also typically connected to the hub of vehicle's road wheel, in order to generate friction for stopping the vehicle. Such automotive braking systems are hermetically sealed, and commonly utilize a non-compressible brake fluid to transfer hydraulic pressure from a control unit to actuate the brake mechanism. In such braking systems, a loss of system efficiency and braking power may result from air in the system.

SUMMARY OF THE INVENTION

A method is provided for detecting a level of functional integrity of a braking system in a motor vehicle. The braking system includes a friction braking mechanism and a brake actuator for actuating the friction braking mechanism via hydraulic pressure. The friction braking mechanism may be configured as a disc brake. The braking system also includes a first sensor configured to sense a displacement of the brake actuator and a second sensor configured to sense the hydraulic pressure in the braking system. The braking system additionally includes a controller adapted for regulating the operation of the hydraulic braking system.

The method includes applying the brake actuator, such as depressing a brake pedal or a button, sensing via the first sensor the hydraulic pressure in the braking system, and sensing via the second sensor the displacement of the brake actuator. The method also includes determining whether the sensed hydraulic pressure in the braking system corresponding to the sensed displacement of the brake actuator is within a predetermined acceptable range.

The method may additionally include determining whether the sensed hydraulic pressure in the braking system corresponding to the sensed displacement of the brake actuator is within a first predetermined threshold range. Furthermore, the method may include determining whether the sensed hydraulic pressure in the braking system corresponding to the sensed displacement of the brake actuator is within a second predetermined threshold range. The method likewise may include setting a first alert if the sensed hydraulic pressure in the braking system corresponding to the sensed displacement of the brake actuator is within a first predetermined threshold range, and setting a second alert if the sensed hydraulic pressure in the braking system corresponding to the sensed displacement of the brake actuator is within a second predetermined threshold range.

According to an embodiment of the method, the controller may include a memory, and the first alert is an alpha-numeric code generated by the controller and stored within the memory. Such an alpha-numeric code may be capable of being retrieved from the memory on demand. The second alert may be at least one of a visible and an audible alert that may be communicated or provided to an operator of the braking system. The second alert may additionally include an alpha-numeric code generated by the controller and stored within the memory for a subsequent retrieval.

The method may further include determining whether the hydraulic pressure sensed via the second sensor is decreasing. If it is determined that the sensed pressure is decreasing, the method may cease determining whether the sensed hydraulic pressure in the braking system corresponding to the sensed displacement of the brake actuator is within any of the predetermined ranges.

Additionally, a system is disclosed for detecting functional integrity in a braking system of a motor vehicle, wherein a controller, such as above, is adapted for executing the aforementioned method.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a flow chart illustrating a method for detecting functional integrity in the braking system depicted in FIG. 1.

DESCRIPTION OF THE PREFERRED EMBODIMENTS

Figure 1:
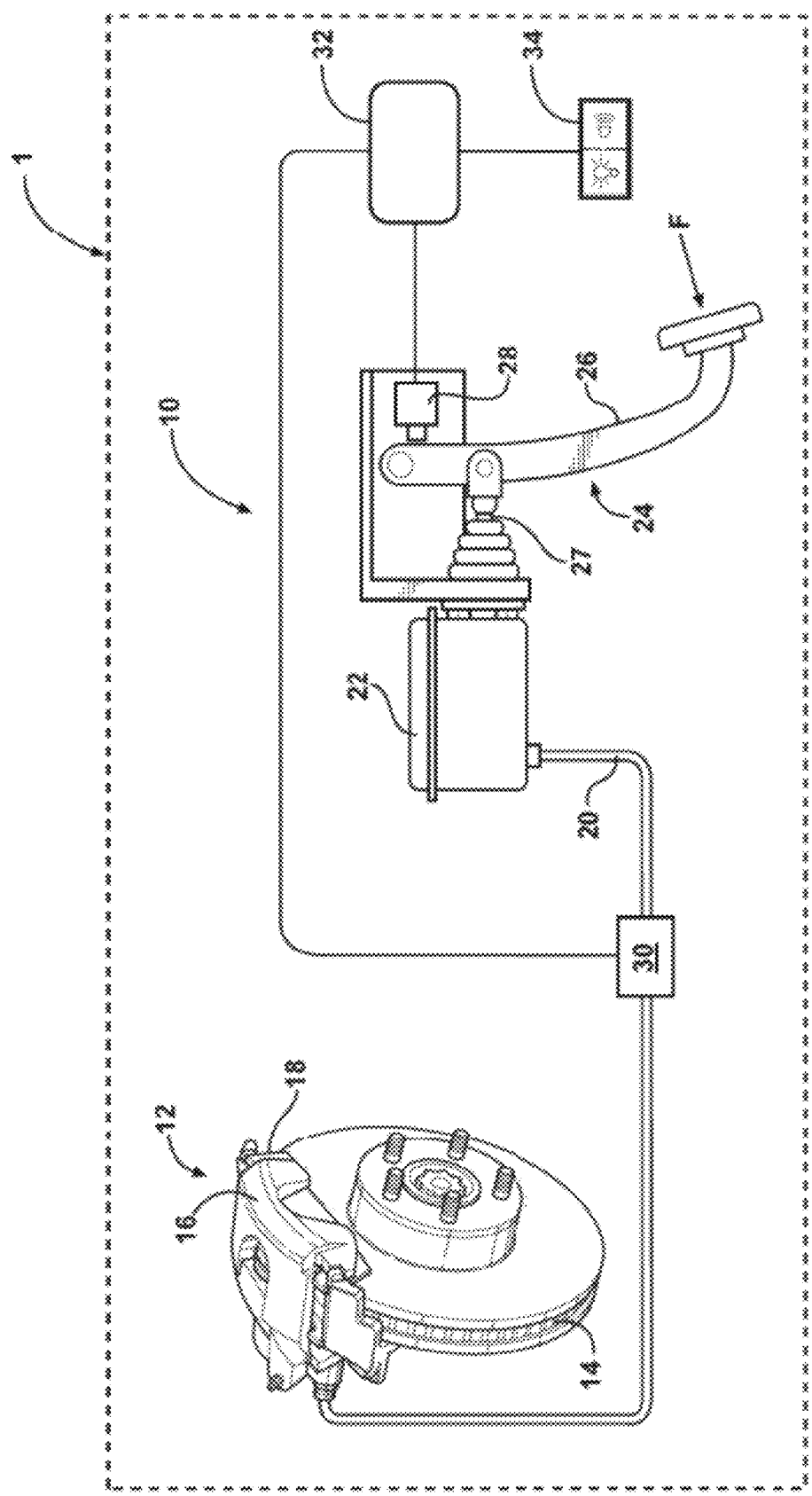
FIG. 1 is a schematic illustration of a motor vehicle brake system employing one or more disc brakes.

Referring to the drawings, wherein like reference numbers refer to like components, FIG. 1 shows a schematic view of a motor vehicle 1 which includes a braking system 10. Braking system 10 is configured to slow or stop the motion of the vehicle 1. Braking system 10 includes a friction braking mechanism 12.

The friction braking mechanism 12 is shown as a disc brake assembly, but may also be a drum brake assembly, as is known in the art. The disc brake assembly 12 includes a rotor 14, typically connected to a road wheel (not shown) of the vehicle 1, such that the road wheel and the rotor rotate as a unit. The disc brake assembly 12 also includes a caliper 16, fixedly connected to a body structure (not shown) of the vehicle 1. The caliper 16 includes one or more pistons (not shown) and houses brake pad set 18.

The one or more pistons are energized by a hydraulic pressure to extend toward the rotor 14 during the operation of the friction braking mechanism 12. Brake pad set 18 typically includes two brake pads, with one brake pad arranged on each side of the rotor 14, such that the rotor 14 is sandwiched by the brake pads. Rotor 14 is squeezed by the brake pad set 18 when the one or more pistons are urged by the hydraulic pressure to extend toward the rotor. The hydraulic pressure is supplied at the brake caliper 16 via a non-compressible fluid delivered by a hydraulic passage 20 from a master brake cylinder 22.

The master brake cylinder 22 acting as a reservoir for the non-compressible fluid is connected to a brake actuator 24. As shown in FIG. 1, brake actuator 24 includes a pivoting brake pedal 26 acting via a mechanical linkage 27 to supply hydraulic pressure to the brake caliper 16. The brake pedal 26 is applied, i.e., depressed, by an operator of the vehicle 1 with a force F when slowing the vehicle is desired. Force F generated at the brake pedal 26 is employed to produce hydraulic pressure at the master brake cylinder 22, and in the hydraulic passage 20. As known by those skilled in the art, a brake booster (not shown) is often employed to magnify the force F provided by the operator. Although brake actuator 24 is shown and described as including the brake pedal 26 with a mechanical linkage, any lever or button that is capable of generating hydraulic pressure, either via a mechanical action, or by an electromechanical connection (such as via a servo-motor), may also be employed.

A first sensor 28 is employed to sense displacement of the brake pedal 26 when the brake pedal is depressed. First sensor 28 may be similarly employed to sense displacement or the linkage 27 when brake pedal 26 is depressed. A second sensor 30 is employed to sense the hydraulic pressure supplied at brake caliper 16. The displacement data for brake pedal 26 from the first sensor 28 and the hydraulic pressure data from the second sensor 30 are communicated to a controller 32, such as an electronic brake control module employed in an anti-lock braking system. When employed together with the anti-lock braking system, second sensor 30 may be integrated into the control module 32. The controller 32 includes a memory, and is capable of being programmed with an algorithm adapted for determining whether hydraulic pressure supplied at brake caliper 16 that corresponds to the sensed displacement of the brake pedal 26 is within one of three predetermined operational ranges (shown in FIG. 2).

Determining whether hydraulic pressure supplied at brake caliper 16 that corresponds to the sensed displacement of the brake pedal 26 is within one of three predetermined operational ranges is desirable for monitoring functional integrity of the brake system 10. Functional integrity of the brake system 10 may deteriorate, if during service the brake system was improperly bled, such that air was allowed to remain in the system, as understood by those skilled in the art. Additionally, the brake system 10 may lose its functional integrity if the system has developed a fluid leak. In such situations, the likely result is that the stopping capability, i.e., the slowing rate and/or stopping distance, of the vehicle 1 will be significantly compromised.

Figure 2:
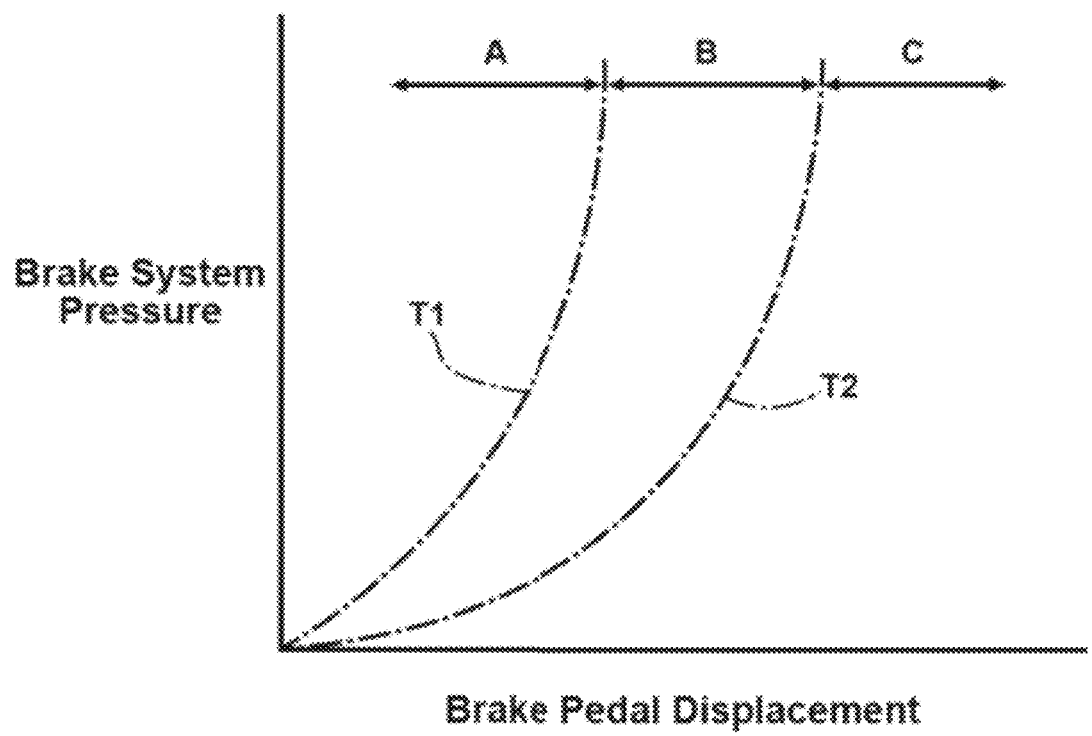
FIG. 2 is a graphical plot of hydraulic pressure supplied at a brake caliper versus the sensed displacement of a brake pedal, illustrating three predetermined operational ranges of the brake system shown in FIG. 1.

The functional characteristics of brake system 10 may be depicted and analyzed by plotting hydraulic pressure supplied at brake caliper 16 (as sensed by second sensor 30) versus the sensed displacement of the brake pedal 26 (as sensed by first sensor 28). FIG. 2 shows three operational ranges A, B, and C of the brake system 10, which describe functional characteristics, i.e., specific response, of the braking system at different levels of the system's functional integrity. The three operational ranges A, B, and C of brake system 10 are predetermined during design and development of vehicle 1 and the brake system.

As shown in FIG. 2, an operational range A is a predetermined acceptable range of operation of the braking system 10, i.e., operational range A is within the accepted design tolerance for a properly operating system. Operational range A extends up to a first predetermined threshold T1. Thus, in the operational range A, the braking system 10 is operating such that the hydraulic pressure supplied at brake caliper 16, as sensed by the second sensor 30, corresponds predictably and according to the design specifications to the sensed displacement of the brake pedal 26, as sensed by the first sensor 28. Furthermore, in the operational range A the response of the friction braking mechanism 12 corresponds predictably to force F applied by the operator.

As shown in FIG. 2, an operational range B is a first predetermined threshold range of operation of the braking system 10, such that the operational range B is outside the accepted design tolerance for a properly operating system. Operational range B extends from the first predetermined threshold T1 up to a second predetermined threshold T2. Although operational range B is outside the accepted design tolerance for a properly operating braking system 10, the braking system is capable of providing adequate slowing or stopping rate, and also capable of stopping vehicle 1 within an acceptable stopping distance in response to applied force F.

The controller 32 is programmed to generate a message or an error-code, such as an alpha-numeric sequence, which represents that the braking system 10 is operating within the second predetermined operational range B. Additionally, controller 32 is capable of storing such an error-code within its memory that may be retrieved on demand. Such an error-code may also be stored in a separate central processing unit (CPU), not shown, of the type that is typically arranged on the vehicle, and governs operation of major vehicle systems. By sensing and storing a service code in the controller 32 or in a separate CPU for subsequent retrieval by service personnel, the braking system 10 is designed to notify that it is in need of being serviced.

As shown in FIG. 2, an operational range C is a second predetermined threshold range of operation of the braking system 10, such that the operational range C is outside the accepted design tolerance for a properly operating braking system. Operational range C extends beyond the second predetermined threshold T2. Braking system 10 operating within the third predetermined operational range C, the stopping distance, as well as the slowing or stopping rate capabilities, however, may fall outside the acceptable range.

The controller 32 is additionally programmed to generate a visible and/or audible alert 34, which represents that the braking system 10 is operating within the third predetermined operational range C. Such an alert may be a warning light displayed on an instrument panel (not shown) of the vehicle 1, along with an audible alert generated for the vehicle operator. By sensing and alerting the operator of the vehicle 1 that the braking system 10 is operating within the third predetermined operational range C, the braking system 10 is designed to warn the operator of a significant loss in braking power. Controller 32 is also capable of storing an error-code, such as an alpha-numeric sequence, within its memory that corresponds to such an operation, so that the error-code may be retrieved on demand.

FIG. 3 depicts a method 50 for detecting functional integrity of a braking system 10 described with respect to FIG. 1. The method commences in frame 52, and proceeds to frame 54, where the brake actuator 26 is actuated or depressed by the operator of vehicle 1. From frame 54 the method proceeds to frame 56, where the displacement of the brake actuator 24 is sensed via the first sensor 28. Following frame 56, the method moves to frame 58, where the hydraulic pressure in the braking system 10 is sensed via the second sensor 30. After frame 58, the method proceeds to frame 60.

In frame 60 the method includes determining whether the hydraulic pressure sensed via the second sensor 30 is increasing, i.e., that the brake actuator 24 is being displaced with a positive gradient. If it is determined that the hydraulic pressure sensed via the second sensor 30 is not increasing, the method proceeds directly to frame 72, where the method is completed. If, on the other hand, it is determined that the hydraulic pressure sensed via the second sensor 30 is increasing, the method proceeds to frame 62.

In frame 62, the method includes determining whether the sensed hydraulic pressure in the braking system 10 corresponding to the sensed displacement of the brake actuator 24 is within the operational range A, i.e., the predetermined acceptable range of operation of the braking system 10 (shown in FIG. 2). If it is determined that the sensed hydraulic pressure in the braking system 10 corresponding to the sensed displacement of the brake actuator 24 is within the operational range A, the method proceeds directly to frame 72, where the method is completed. If, on the other hand, it is determined that the sensed hydraulic pressure in the braking system 10 corresponding to the sensed displacement of the brake actuator 24 is outside the operational range A, the method moves on to frame 64.

In frame 64, the method includes determining whether the sensed hydraulic pressure in the braking system 10 corresponding to the sensed displacement of the brake actuator 24 is within the operational range B, i.e., the first predetermined threshold range of operation of the braking system 10 (shown in FIG. 2). If it is determined that the sensed hydraulic pressure in the braking system 10 corresponding to the sensed displacement of the brake actuator 24 is within the operational range B, the method moves on to frame 66.

In frame 66, a first alert, such as a message or an error-code described with respect to FIG. 1, is generated and stored by the controller 32. Following frame 66, the method moves on to frame 72, where the method is completed. If, on the other hand, it is determined that the sensed hydraulic pressure in the braking system 10 corresponding to the sensed displacement of the brake actuator 24 is outside the operational range B, the method moves on to frame 68.

In frame 68, the method includes determining whether the sensed hydraulic pressure in the braking system corresponding to the sensed displacement of the brake actuator 24 is within the operational range C, i.e., the second predetermined threshold range of operation of the braking system 10 (shown in FIG. 2). If it is determined that the sensed hydraulic pressure in the braking system corresponding to the sensed displacement of the brake actuator 24 is within the operational range C, the method moves on to frame 70.

In frame 70, a second alert, such as the visible and/or audible alert 34 described with respect to FIG. 1, is generated, and may also be stored by the controller 32. Following frame 70, the method moves on to frame 72, where the method is completed. If, on the other hand, it is determined that the sensed hydraulic pressure in the braking system corresponding to the sensed displacement of the brake actuator 24 is outside the operational range C, the method moves directly to frame 72, where the method is completed.

While the best modes for carrying out the invention have been described in detail, those familiar with the art to which this invention relates will recognize various alternative designs and embodiments for practicing the invention within the scope of the appended claims.

The invention claimed is:

1. A method for detecting functional integrity of a braking system, the braking system including a friction braking mechanism, a brake actuator for actuating the friction braking mechanism via a hydraulic pressure, a first sensor configured to sense the hydraulic pressure in the braking system, a second sensor configured to sense a displacement of the brake actuator, and a controller adapted for regulating the operation of the braking system, the method comprising:
   applying the brake actuator;
   sensing via the first sensor the displacement of the brake actuator;
   sensing via the second sensor the hydraulic pressure in the braking system;
   determining whether the sensed hydraulic pressure in the braking system corresponding to the sensed displacement of the brake actuator is within a predetermined acceptable range; and
   determining whether the sensed hydraulic pressure in the braking system corresponding to the sensed displacement of the brake actuator is within a second predetermined threshold range, and setting a second alert if the sensed hydraulic pressure in the braking system corresponding to the sensed displacement of the brake actuator is within the second predetermined threshold range.

2. The method of claim 1, further comprising determining whether the sensed hydraulic pressure in the braking system corresponding to the sensed displacement of the brake actuator is within a first predetermined threshold range, and setting a first alert if the sensed hydraulic pressure in the braking system corresponding to the sensed displacement of the brake actuator is within the first predetermined threshold range.

3. The method of claim 2, wherein the controller includes a memory, the first alert is an alpha-numeric code generated by the controller, stored within the memory, and the alpha-numeric code is capable of being retrieved from the memory on demand.

4. The method of claim 1, wherein the second alert is at least one of a visible alert provided to an operator of the braking system, an audible alert provided to an operator of the braking system, and an alpha-numeric code generated by the controller and stored within the memory, such that the alpha-numeric code is capable of being retrieved from the memory on demand.

5. The method of claim 1, further comprising determining whether the hydraulic pressure sensed via the second sensor is decreasing.

6. The method of claim 5, further comprising ceasing said determining whether the sensed hydraulic pressure in the braking system corresponding to the sensed displacement of the brake actuator is within any of the predetermined ranges, if it is determined that the sensed pressure is decreasing.

7. A system for detecting functional integrity of a braking system, the braking system comprising:
   a friction braking mechanism;
   a brake actuator for actuating the friction braking mechanism via a hydraulic pressure;
   a first sensor configured to sense a displacement of the brake actuator;
   a second sensor configured to sense the hydraulic pressure in the braking system; and
   a controller adapted for:
      determining whether the sensed hydraulic pressure in the braking system corresponding to the sensed displacement of the brake actuator is within a predetermined acceptable range; and
      determining whether the sensed hydraulic pressure in the braking system corresponding to the sensed displacement of the brake actuator is within a second predetermined threshold range, and setting a second alert if the sensed hydraulic pressure in the braking system corresponding to the sensed displacement of the brake actuator is within the second predetermined threshold range.

8. The system of claim 7, wherein the controller is further adapted for determining whether the sensed hydraulic pressure in the braking system corresponding to the sensed displacement of the brake actuator is within a first predetermined threshold range, and setting a first alert if the sensed hydraulic pressure in the braking system corresponding to the sensed displacement of the brake actuator is within the first predetermined threshold range.

9. The system of claim 8, wherein the controller includes a memory, the first alert is an alpha-numeric code generated by the controller and stored within the memory, and the alpha-numeric code is capable of being retrieved from the memory on demand.

10. The system of claim 7, wherein the second alert is at least one of a visible alert provided to an operator of the braking system, an audible alert provided to an operator of the braking system, and an alpha-numeric code generated by the controller and stored within the memory, such that the alpha-numeric code is capable of being retrieved from the memory on demand.

11. The system of claim 7, wherein the controller is further adapted for determining whether the hydraulic pressure sensed via the second sensor is decreasing.

12. The system of claim 11, wherein the controller is further adapted for ceasing said determining whether the sensed hydraulic pressure in the braking system corresponding to the sensed displacement of the brake actuator is within any of the predetermined ranges, if it is determined that the sensed pressure is decreasing.

13. A motor vehicle comprising:
a braking system for decelerating the vehicle, the braking system including:
a friction braking mechanism;
a brake actuator for actuating the friction braking mechanism via a hydraulic pressure; and
a controller adapted for regulating the operation of the braking system;
a system for detecting functional integrity of the braking system including:
a first sensor configured to sense a displacement of the brake actuator; and
a second sensor configured to sense the hydraulic pressure in the braking system;
wherein the controller has an algorithm adapted for:
determining whether the sensed hydraulic pressure in the braking system corresponding to the sensed displacement of the brake actuator is within a predetermined acceptable range; and
determining whether the sensed hydraulic pressure in the braking system corresponding to the sensed displacement of the brake actuator is within a first predetermined threshold range, and setting a first alert if the sensed hydraulic pressure in the braking system corresponding to the sensed displacement of the brake actuator is within the first predetermined threshold range.

14. The vehicle of claim 13, wherein the algorithm is further adapted for determining whether the sensed hydraulic pressure in the braking system corresponding to the sensed displacement of the brake actuator is within a first predetermined threshold range, and setting a first alert if the sensed hydraulic pressure in the braking system corresponding to the sensed displacement of the brake actuator is within the first predetermined threshold range.

15. The vehicle of claim 13, wherein the controller includes a memory, the first alert is an alpha-numeric code generated by the controller and stored within the memory, and the alpha-numeric code is capable of being retrieved from the memory on demand.

16. The vehicle of claim 13, wherein the second alert is at least one of a visible alert provided to an operator of the braking system, an audible alert provided to an operator of the braking system, and an alpha-numeric code generated by the controller and stored within the memory, such that the alpha-numeric code is capable of being retrieved from the memory on demand.

17. The vehicle of claim 13, wherein the algorithm is further adapted for determining whether the hydraulic pressure sensed via the second sensor is decreasing, and for ceasing said determining whether the sensed hydraulic pressure in the braking system corresponding to the sensed displacement of the brake actuator is within any of the predetermined ranges, if it is determined that the sensed pressure is decreasing.

* * * * *